US010979519B2

(12) United States Patent
Ghike et al.

(10) Patent No.: US 10,979,519 B2
(45) Date of Patent: Apr. 13, 2021

(54) BROADCASTING NOTIFICATIONS WITH LOW LATENCY

(71) Applicant: Microsoft Technology Licensing, LLC, Redmond, WA (US)

(72) Inventors: Swapnil Ghike, Santa Clara, CA (US); Changji Shi, Mountain View, CA (US); David Benjamin Liu, Mountain View, CA (US); Guanchao Wang, Foster City, CA (US); Sandor Nyako, Sunnyvale, CA (US); Netra Malagi, San Jose, CA (US); Amit Ruparel, Sunnyvale, CA (US); Cheng-Fu Lin, Sunnyvale, CA (US); Akhilesh Gupta, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 16/252,150

(22) Filed: Jan. 18, 2019

(65) Prior Publication Data
US 2020/0236183 A1 Jul. 23, 2020

(51) Int. Cl.
*H04L 29/08* (2006.01)
*H04L 29/06* (2006.01)

(52) U.S. Cl.
CPC .......... *H04L 67/26* (2013.01); *H04L 65/4076* (2013.01); *H04L 67/1097* (2013.01)

(58) Field of Classification Search
CPC .. H04L 67/26; H04L 65/4076; H04L 67/1097
See application file for complete search history.

(56) References Cited

U.S. PATENT DOCUMENTS

| 2007/0100951 | A1* | 5/2007 | Bae | H04L 51/24 709/206 |
| 2010/0169344 | A1* | 7/2010 | Ellis | G06Q 10/107 707/758 |
| 2011/0161987 | A1* | 6/2011 | Huang | G06Q 10/10 719/318 |
| 2012/0331047 | A1* | 12/2012 | Sana | H04L 65/1069 709/203 |

(Continued)

*Primary Examiner* — Chris Parry
*Assistant Examiner* — Adam A Cooney
(74) *Attorney, Agent, or Firm* — Hickman Becker Bingham Ledesma LLP; Daniel D. Ledesma

(57) ABSTRACT

Techniques for broadcasting notifications with low latency are provided. A set of recipients for a notification of a content item is determined. The notification is stored in a second notifications storage that is separate from a first notifications storage. A request for one or more notifications is received over a computer network from a client device that is associated with a particular recipient in the set of recipients. In response to receiving the request, first notification data is retrieved from the first notifications storage, second notification data that includes the notification is retrieved from the second notifications storage. The first notification data is combined with the second notification data to generate combined notification data. The combined notification data is transmitted over the computer network to the client device and is stored in the first notifications storage. The notification may be removed from the first notifications storage.

20 Claims, 3 Drawing Sheets

(56) References Cited

U.S. PATENT DOCUMENTS

| | | | |
|---|---|---|---|
| 2014/0189023 A1* | 7/2014 | Lowry | H04L 67/2819 709/206 |
| 2015/0304265 A1* | 10/2015 | Vincent | H04L 51/24 709/206 |
| 2017/0289287 A1* | 10/2017 | Modi | G06F 16/24578 |
| 2018/0309631 A1* | 10/2018 | Li | H04L 51/36 |

* cited by examiner

BROADCASTING NOTIFICATIONS WITH LOW LATENCY

TECHNICAL FIELD

The present disclosure relates to delivering notifications over one or more computer networks and, more particularly to, decreasing latency of broadcasting a large number of notifications.

BACKGROUND

Online networks are forming at a fast pace. Each day entities (e.g., people and organizations) register with online network providers in order to make virtual connections with others, send messages, share content, and view relevant content. Some entities have many connections or followers. A follower of a particular entity is a person or entity that has signaled an intention to receive content from the particular entity. An entity might be very popular, which means that notifications about content that the entity generates and uploads to an online network provider should be broadcast to a large audience and delivered in a timely fashion, such as a notification of live streaming video from the entity. However, current approaches for delivering notifications are slow and suffer from unacceptable latency.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for broadcasting notifications with low latency are provided. In one technique, in response to detecting that content is available, a computer system identifies a list of recipients and sends a notification to one of multiple types of storage. In response to a read request from a computing device of a recipient, the computer system checks each type of storage for available notifications for that recipient and, if available in the different types of storage, combines the notifications and delivers the combined notifications to the computing device.

Embodiments improve computer technology by reducing the latency of delivering notifications to many different computing devices. Prior approaches could not handle storing thousands or millions of notifications in a short period of time. Embodiments achieve the improvement in multiple ways, such as leveraging different types of storage for storing notifications and pre-computing a list of recipients of a notification so that the notification may be delivered without significant delay.

System Overview

Figure 1:
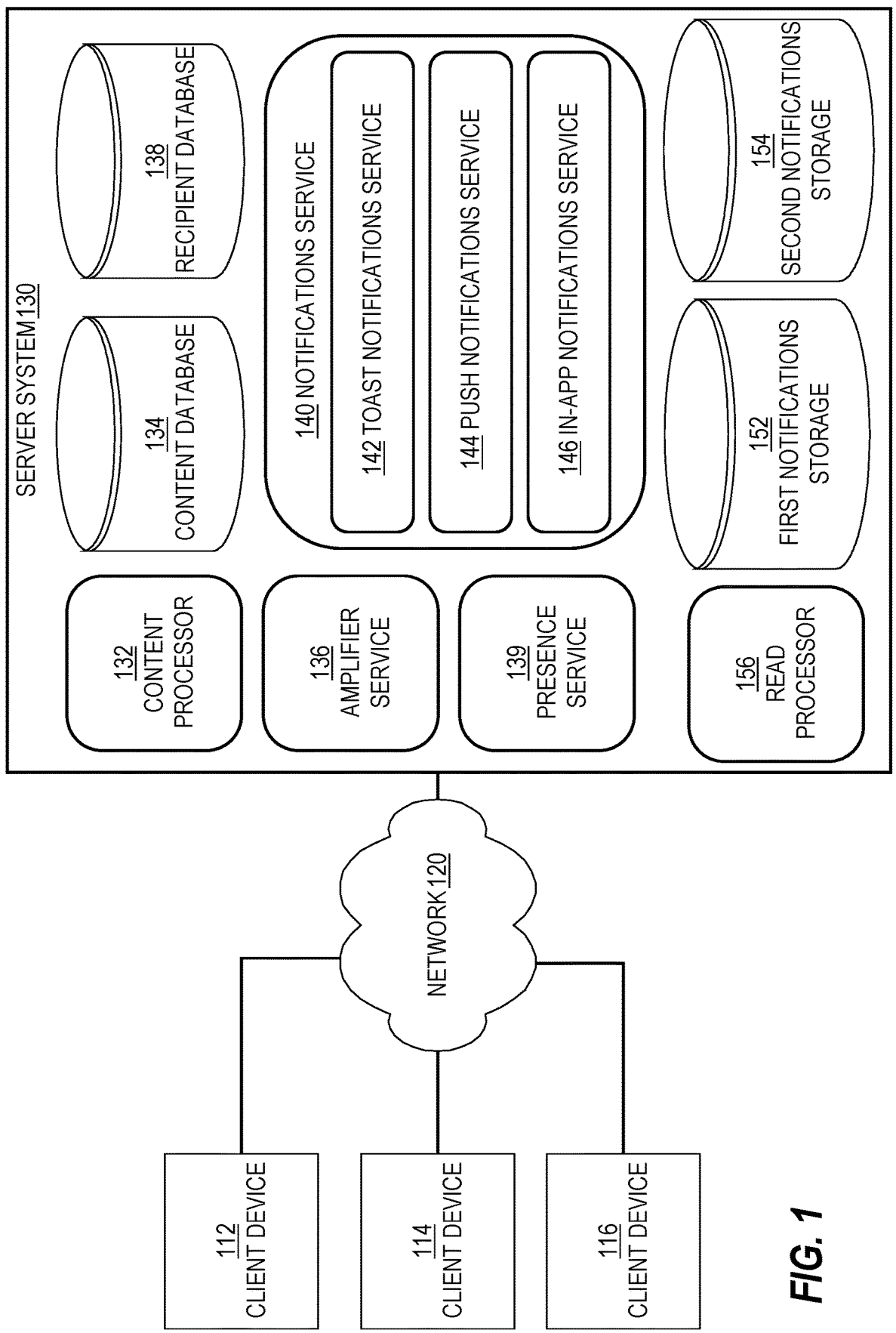
FIG. 1 is a block diagram that depicts an example system for transmitting notifications to intended recipients, in an embodiment.

FIG. 1 is a block diagram that depicts an example system 100 for transmitting notifications to intended recipients, in an embodiment. System 100 includes client devices 112-116, network 120, and server system 130. An example of an entity that provides or operates server system 130 is an online social network provider, such as LinkedIn.

Examples of client devices 112-116 include desktop computers, laptop computers, tablet computers, wearable devices, video game consoles, and smartphones. An example of an application that executes on one of client devices 112-116 includes a dedicated application that is configured to communicate with server system 130 over network 120. Another example of an application is a web application that is downloaded from server system 130 and that executes within a web browser running on the client device. Although only three client devices are depicted, there may be many more client devices that are communicatively coupled to server system 130.

Network 120 may be implemented on any medium or mechanism that provides for the exchange of data between client devices 112-116 and server system 130. Examples of network 120 include, without limitation, a network such as a Local Area Network (LAN), Wide Area Network (WAN), Ethernet or the Internet, or one or more terrestrial, satellite or wireless links.

Server System

Server system 130 includes a content processor 132, a content database 134, an amplifier service 136, a recipient database 138, a presence service 139, a notifications service 140, a first notifications storage 152, a second notifications storage 154, and a read processor 156.

Content processor 132 receives content from one or more of client devices 112-116 and stores the content in content database 134. At least some of the content is classified as user-generated content (UGC), such as a live video stream that is transmitted from client device 112. UGC may be text, graphics, audio, and/or video. Users of client devices 112-116 may be registered members (or non-user entities, such as companies, schools, associations, groups) of a social network service and may have numerous (two-way or "bidirectional") connections and/or followers (or one-way/unidirectional connections).

Content database 134 contains data about multiple content items that are uploaded to server system 130 from client devices, such as client devices 112-116. Example content items include video streams, weekly digests, daily digests, and two-way or group messages. A digest may include information about multiple entities, such as people and/or organizations that a particular member has explicitly followed or liked. As the names suggest, a daily digest is sent daily and a weekly digest is sent weekly. Some consecutive daily or weekly digests may include information about the same person or organization.

Amplifier service 136 identifies multiple recipients for a notification of a content item. Such identification may be performed in response to input that indicates that an intended audience is supposed to be notified of a particular content item. The input may include a member or entity identifier of the content generator and, optionally, data about the particular content item. Amplifier service 136 uses the producing member's or entity's identifier to look up, in recipient database 138, a set of recipients for a notification about the availability of the particular content item.

A notification for a content item includes a content item identifier that is used to retrieve the content item from content database 134. For example, if the content item is a live video stream, then user selection of a corresponding notification causes the live video stream to be presented to the user through a client application executing on a computing device of the user.

Recipient List Generation

In an embodiment, recipients of a notification pertaining to a particular entity are determined offline; that is, not in response to input indicating that content is available about or from the particular entity. Examples of the particular entity include a person, a group of people, an association, and an organization, such as a company, a charitable organization, a government agency, and an academic institution (e.g., an elementary school, a college, or a university). A representative of an entity (organization or a celebrity) may act on the entity's behalf to make content available to multiple followers of the entity.

The offline determination may be performed by a computer job that is executing on one or more computing devices that have access to an (e.g., offline, nearline, or online) entity database. Each record in the entity database includes (or references) a list of recipients. Lists of recipients determined based on the offline computer job are stored in recipient database 138, which may be a key-value store, where the key is an entity identifier and the corresponding value is a list of recipients.

An advantage of determining a set of recipients for a notification offline is reducing the latency for delivering notifications to the set of recipients. If the set of recipients is determined online or in response to input indicating that certain content is available, then the time to determine the set of recipients would not be insignificant and would delay the delivering of the notifications, particularly if the number of eligible recipients is relatively large. Such a delay is often unacceptable to latency-sensitive use cases such as notifications about a live video stream. For example, some entities (e.g., famous individuals or companies) may have thousands or millions of followers or people that have "liked" content produced by those entities.

Offline determination of a recipient list for each entity of multiple entities may be performed periodically, such as every four hours or daily. Such a periodic determination is acceptable especially if recipient lists do not change significantly on an hourly, daily, or weekly basis. Those who follow or connect with a particular entity after the most recent recipient list of the particular entity is determined will not receive a notification about content (that is about the particular entity or that is published by the particular entity) that is made available after that recipient list is determined.

In an embodiment, the process or computer job that computes a candidate recipient list for a particular entity generates, for each candidate recipient, a score that indicates a relevance of a content item to the candidate recipient, a likelihood that the candidate recipient will consume (e.g., watch or listen to) the content item, or a likelihood that the candidate recipient will select (or otherwise positively interact with) a notification about the content item. The process or computer job may implement a rule-based or a machine-learned prediction model that takes into account multiple features, such as attributes of a candidate recipient (e.g., job title, employment status, industry, job function, associated topics, interests, skills employer name, academic degree(s) earned, language), attributes of the publishing entity (e.g., industry, size (if an organization), job title), and attributes of the context (e.g., time of day, day of week, operating system of recipient's computing device, mobile or desktop).

The scores generated for candidate recipients in a candidate recipient list are used to rank or order the candidate recipient list. In a related embodiment, a threshold score is defined and applied such that for any score below the threshold score, the corresponding candidate recipient is not included in a final recipient list.

In an embodiment, the number of recipients in a final recipient lists is capped. For example, a maximum of one hundred thousand recipients will receive a notification about a particular content item that is published by a particular entity or is about the particular entity. The maximum may be modified manually or automatically. For example, if the time that elapses to send notifications to a recipient list of the maximum size is less than a particular amount (e.g., five seconds), then the maximum size increases automatically (e.g., 5%). Similarly, if the time that elapses to send notifications to a recipient list of the maximum size is greater than a particular amount, then the maximum size decreases automatically.

Once a final recipient list is generated for a particular entity, recipient database 138 is updated to include that list, which may replace a prior list for the particular entity. Thus, recipient database 138 includes multiple recipient lists, one for each of multiple entities. Each recipient list in recipient database 138 may be keyed by entity identifier. Thus, given an entity identifier from amplifier service 136, recipient database 138 returns a list that is associated with that entity identifier. Therefore, a runtime determination of a recipient list for a particular entity is minimal. Once the recipient list is retrieved, amplifier service 136 may start "firing" notifications.

Notifications

A notification includes data about a content item. A notification may merely: (a) be an indication of the actual content item but not contain any content of the content item; (b) include a small portion of the actual content item; or (c) include the entirety of the content item.

A notification may also include age data that indicates when the corresponding content item was originally posted, last liked, last commented on, etc. A notification may include a name (e.g., first and last names) of the originator or author of the corresponding content item. A notification may also include an image (e.g., a profile image) of the originator or author.

A notification may also indicate an action that the originator or author performed or is performing, such as posting an article or creating a live video stream. A notification may also indicate an action that another member (whom the recipient might know) performed relative to the content item, such as liking, commenting, or sharing the content item. A notification may also indicate how the content may relate to one or more interests associated with the recipient. For example, a notification may specify a topic in which the recipient is also associated.

Notification Channels

Notifications service 140 is responsible for transmitting notifications to the appropriate recipients based on input from amplifier service 136. Input for a notification may include a content item identifier and a recipient list. Based on the content item identifier, notifications service 140 retrieves at least a portion of the corresponding content item from content database 134 and sends a notification to each computing device associated with each recipient in the recipient list.

In an embodiment, notifications service 140 comprises multiple "sub-services": toast notifications service 142, push notifications service 144, and in-app notifications service 146, each corresponding to a different notification channel. Other embodiments include more or less notification sub-services.

In this embodiment, there are three types of notification channels: one channel for a toast notifications, another channel for push notifications, and another channel for in-app notifications. Each type of notification channel is handled, respectively, by toast notifications service 142, push notifications service 144, and in-app notifications service 146.

A toast notification is a notification that is sent to a recipient's computing device and presented as a pop-up message over a corresponding application provided by the entity that provides server system 130 (e.g., LinkedIn), whether a client application (whether a mobile native application or a web application) that executes within a web browser on a computing device. Thus, a toast notification requires that the application is currently active and, optionally, an interface provided by the application is currently displayed on the computing device. A user selecting a toast notification causes a landing page of the content to be displayed.

A push notification is a notification that is sent to the member's computing device (e.g., a smartphone) and processed by an operating system of the computing device. Such a notification is displayed when the corresponding application (e.g., a mobile native application or a web application) that is configured to communicate with server system 130 (though installed) is not active or is not currently being displayed. A user selecting a push notification causes the corresponding application to be activated or to launch (if not already activated or launched) and a landing page of the content to be displayed.

Both a toast notification and a push notification may be persistent in that the notification may be displayed continuously (e.g., at the top of the screen) until user input is received to disregard the notification or to view the notification. Alternatively, the notification may be displayed for a limited time (e.g., three seconds) before automatically disappearing from view. Either way, an indication of the notification may be presented on or adjacent to an icon that represents the corresponding application.

An in-app notification is a notification that is displayed when the intended recipient interacts with server system 130 (or an affiliated system) through the corresponding application, whether a client application (whether a mobile native application or a web application). For example, the application may display multiple user-selectable persistent tabs (or buttons), one of which corresponds to notifications. Other tabs correspond to other types of content and/or actions, such as a tab for messaging, a tab for editing a user profile, a tab for viewing a "news" feed, and a tab for searching for users, organizations, or groups that satisfy certain user-specified criteria. Selecting the notification tab (or button) causes new (or unread) and, optionally, past (or read) notifications to be listed or presented in their entirety.

An indication of an in-app notification may comprise a small red dot that appears over a notifications tab in a web application while another tab is currently active/open to the corresponding user. As a related example, a small red dot includes a number indicating a number of notifications that have not yet been viewed by the corresponding recipient. Thus, when a new notification is sent to this member/account, the number increments by one.

A user selecting an in-app notification causes additional information about the corresponding content item to be presented. For example, selecting an in-app notification for a live streaming video causes the live streaming video to be streamed to the computing device. As another example, selecting an in-app notification for a content item consisting of only static text and one or more images causes the entirety of the content item to be presented, such as in a different tab or view of the corresponding application.

In an embodiment, amplifier service 136 causes multiple types of notifications to be transmitted over network 120 to computing devices (e.g., client devices 112-116) of intended recipients. For example, for some recipients, amplifier service 136 causes push notifications to be transmitted while for other recipients, amplifier service 136 causes toast notifications to be transmitted.

Online Status

In an embodiment, amplifier service 136 determines an online status for each recipient in a recipient list retrieved from recipient database 138. The online status of a recipient dictates a type of notification to send to a computing device of the recipient and/or which downstream service will send the notification.

In a related embodiment, amplifier service 136 performs an intersection of a recipient list and a list of online users. If a user/member identifier is found in both lists, then the corresponding recipient is considered "online." If a user/member identifier is found only in the recipient list, then the corresponding recipient is considered "offline."

In an embodiment, a list of online users is generated by presence service 139 that continuously or regularly updates status storage (e.g., implemented as a cache) that is accessible to amplifier service 136. For example, the cache may be local to the device on which amplifier service 136 executes. If amplifier service 136 executes on multiple computing devices concurrently, then the status storage may be replicated on each of the computing devices.

In order to determine an online status of a user, presence service 139 receives periodic messages (or "heartbeats") from a client application (whether a mobile application or a web application) executing on a computing device of the user. When the user is "online" (which may be reflected in the client application being currently active or an interface thereof being currently displayed), the client application sends a heartbeat message indicating that the client application is active. The heartbeat message may indicate that a message type (i.e., that it is a heartbeat message) and include a user/member identifier. If a client application does not send a message after a period of time, then presence service 139 presumes that the user is offline.

In an embodiment, presence service 139 updates the status storage regularly with identifiers of users that are considered online. For example, two updates to the status storage may be identical, indicating that at the time of the second update, the set of users that were considered online at the time of the first update are still online and no new users have been detected as online. In a likely scenario, there will be significant overlap between the users indicated in the two updates, with some users indicated in the first update no longer indicated in the second update and some users indicated in the second update who were not indicated in the first update.

In an embodiment, amplifier service 136 sends different lists of recipients to different sub-services. In this embodiment, the status of the recipient is inherent in which sub-service processes a list of recipients. For example, amplifier service 136 sends a first list of recipients to toast notifications service 142, a second list of recipients to push notifications service 144, and a third list of recipients to in-app notifications service 146. In an alternative embodiment, amplifier service 136 sends, to notifications service 140, a list of recipients and a status indicator for each recipient in the list of recipients. In this embodiment, notifications service 140 uses the status of a recipient to determine the notification channel through which to send a notification to the recipient. For example, for an online recipient, notifications service 140 causes a toast notification to be transmitted to a computing device of the online recipient (e.g., by calling toast notifications service 142 with a computing device identifier). For an offline recipient, notifications service 140 causes a push notification to be transmitted to a computing device of the offline recipient (e.g., by calling push notifications service 144 with a computing device identifier).

In an embodiment, an in-app notification is sent to each recipient in a recipient list determined by amplifier service 136. In a related embodiment, toast notification is sent to each recipient in the recipient list that is associated with an online status while a push notification is sent to each recipient in the recipient list that is associated with an offline status. Thus, each recipient might receive two notifications: an in-app notification and either a toast notification or a push notification. In the example above where three recipient lists are sent to services 142-146, respectively, the third list is a union of the first list and the second list.

Multiple Storage Types

In an embodiment, notifications service 140 (or in-app notifications service 146) leverages multiple types of storage to store in-app notifications. An in-app notification is one that is displayed in a certain location (e.g., tab or view) within the client application (whether a mobile application or a web application). Thus, an in-app notification is displayed through the client application when a request from the client application is received, for example, by notifications service 140 or another component of server system 130. Some in-app notifications are stored in first notifications storage 152, which stores notifications of a first type and other in-app notifications are stored in second notifications storage 154, which stores notifications of a second type that is different than the first type. First notifications storage 152 is considered heavy-weight storage while second notifications storage 154 is considered light-weight storage. Other embodiments may include more types of storage than these.

Which storage an in-app notification is stored to depends on the type of notification. Some notifications need to be delivered quickly while other notifications do not. Notifications that need to be delivery quickly are referred to as "fast" notifications. Some notifications are relevant for a relatively short period of time (e.g., ten minutes). Such notifications are referred to as "short-lived" notifications. Examples of fast and short-lived notifications include live video notifications, breaking news notifications, and a daily digest. Other types of content that might require fast notifications include certain messages, such as chat-like messages that are shared between a pair of users in an online conversation or group messages that are shared among users in a group of three or more users.

In an embodiment, fast and/or short-lived notifications are stored in second (or light-weight) notifications storage 154 and other types of notifications are stored in first (or heavy-weight) notification storage 152. Examples of heavy-weight storage include a relational database management system (RDBMS) provided by Oracle. Examples of light-weight storage is a distributed key-value store, such as Voldemort, and an open-source, NoSQL, multi-model, document-oriented database that stores JSON documents, such as Couchbase. Heavy-weight storage supports more features than light-weight storage, such as indexing, a blue carpet experience (where each in-app notification for a user has a certain (e.g., blue) background that indicates whether the notification has previously been presented to the user and, optionally, a timestamp of when that previous presentation occurred), a mute feature (where a user indicates that s/he does not want to receive any more notifications pertaining to a particular content item (e.g., online article) upon which the user interacted previously (e.g., liked/shared/commented)), and an un-follow feature (where a user indicates that s/he does not wish to receive any more notifications pertaining to a particular entity), and notification aggregation (where multiple (e.g., live stream video) notifications are combined or collapsed into a single notification (e.g., "You have 3 live video streams pending") that refers to multiple individual content items). Light-weight storage has high write throughput relative to heavy-weight storage. Because it takes a significant amount of time and computational resources to write a notification to the heavy-weight storage, the heavy-weight storage cannot handle high load as well as time sensitive use cases that also have highly "bursty" traffic (such as live streaming of video) as quickly as light-weight storage can.

Reading from Multiple Notification Storages

A client application (e.g., executing on client device 112) transmits a read request (e.g., in the form of an HTTP) to over network 120 to server system 130. The read request includes a recipient (e.g., member) identifier. The read request is for one or more in-app notifications. The read request may be a request for only new (or unread) notifications for the corresponding recipient, for all notifications that have been sent to the recipient, or for only the last N (e.g., five) notifications. The value of N may depend on the type of client device (or the size of the screen of the client device, or type of client application) that transmitted the read request.

In some scenarios, a read request is sent to server system 130 in response to a user selecting a push notification or a toast notification. In other scenarios, a read request is sent to server system 130 in response to a user activating the corresponding client application or selecting a notifications tab or a notifications button in an interface presented by the corresponding client application. When a client application is activated, the client application may regularly transmit a read request (e.g., every ten seconds) to check whether there are any new notifications for the user/member of the client application. Alternatively, a different server system (such as a real-time platform) may push new notifications to the client application over a persistent network connection.

In an embodiment, read processor 156 receives a read request, identifies the recipient identifier in the read request, and uses the recipient identifier to look up any notifications in one or more notification storages.

In a related embodiment, read processor 156 uses the recipient identifier to look up zero or more notifications in first notifications storage 152 and zero or more notifications in second notifications storage 154.

Combining Notifications

In some scenarios, first notifications storage 152 includes one or more first notifications for a recipient and second notifications storage 154 includes one or more second notifications for the recipient. Thus, read processor 156 combines the first notification(s) with the second notification(s) to generate combined notification data that includes data about the first notification(s) and the second notification(s) and returns the combined notification data to the client device that transmitted the read request.

In an embodiment, read processor 156 stores the combined notification data in first (heavy-weight) notifications storage 152, which may replace the one or more first notifications. Such replacement may be performed after a response to the read request is transmitted. Also, the one or more second notifications are deleted from second (light-weight) notifications storage 154. If read processor 156 receives another read request associated with the recipient, then read processor 156 checks both notifications storages (again) and may determine that second notifications storage 154 does not contain any notifications. Instead, read processor 156 retrieves the combined notification data from first notifications storage 152 along with any additional notifications that have been stored in first notifications storage 152 after the previous read request. In this way, read request processing avoids the subsequent combining of notifications from different storages at runtime (at least for the corresponding recipient), thus reducing latency that comes from combining notifications.

In an embodiment, notifications from second notifications storage 154 are automatically replicated to first notifications storage 152 and deleted from second notifications storage 154 and not in response to any read requests for the notifications. For example, every minute, notifications for one hundred recipients are identified in second notifications storage 154 and used to update, respectively, the available notifications for those recipients in first notifications storage 152. For example, a notification for recipient A in storage 154 is identified and used to update a set of notifications for recipient A in storage 152. Every minute, the identity of the recipients may change, such that notifications for a different set of recipients are identified and replicated to first notifications storage 152.

The time between such asynchronous replication may vary based on developer-specified settings or automatically based on current load on first and/or second notifications storages 152-154. For example, if fewer than N notifications are stored in first notifications storage 152 in the last M seconds, then notifications from second notifications storage 154 are replicated to the corresponding user records or accounts in first notifications storage 152.

In a related embodiment, which notifications are replicated from second notifications storage 154 to first notifications storage 152 varies based on notification type. For example, short-lived notifications (e.g., regarding live streaming video or daily digests) are not replicated to first notifications storage 152 while other types of notifications (i.e., "longer-lived") are replicated.

Multi-Colo Environment

In an embodiment, server system 130 is part of a multi-data center environment where each data center includes the same (or most of the same) data and processing capabilities across multiple data centers. For example, each data center includes an instance of amplifier service 136, an instance of recipient database 138, an instance of notifications service 140, instances of first and second notifications storages 152-154, and an instance of read processor 156. One data center may be responsible for computing recipient lists that are stored in one instance of recipient database 138; however, replication components in that data center are responsible for replicating those computed recipient lists to other instances of recipient database 138 in other data centers.

Different databases may have different replication latencies across data centers. For example, a first instance of second notifications storage 154 in data center A may replicate to a second instance of second notifications storage 154 in data center B at a first time while a first instance of content database 134 in data center A replicates to a second instance of content database 134 in data center B at a second time. In this example, user selection of a live stream video notification delivered through the second instance of second notifications storage 154 may result in no video content if the video content has not yet been replicated to the second instance of content database 134.

In an embodiment, to address this difference in replication rates, a notification is not generated in a source data center until the source data center (e.g., an instance of amplifier service 136) receives confirmation data that the content item associated with the notification is replicated to the other data centers.

In another embodiment, a notification is generated to include data center data that indicates a data center in which data about the corresponding content item was received. For example, if a data center A receives a content item (or a portion thereof), then a notification is generated that identifies not only the content item, but also data center A. Later, the notification is replicated to data center B. A client device sends a read request to data center B, which retrieves the notification and determines that the content item is not available in data center B (e.g., by requesting the content item from an instance of content database 134 in data center B). Thus, the content item has not yet been replicated to data center B. Data center B (e.g., an instance of read processor 156 in data center B or another component in data center B) identifies the data center data and sends, to data center A, a request for the content item, which data center B later receives in response and then transmits the content item over a computer network to the client device.

Example Process

Figure 2:
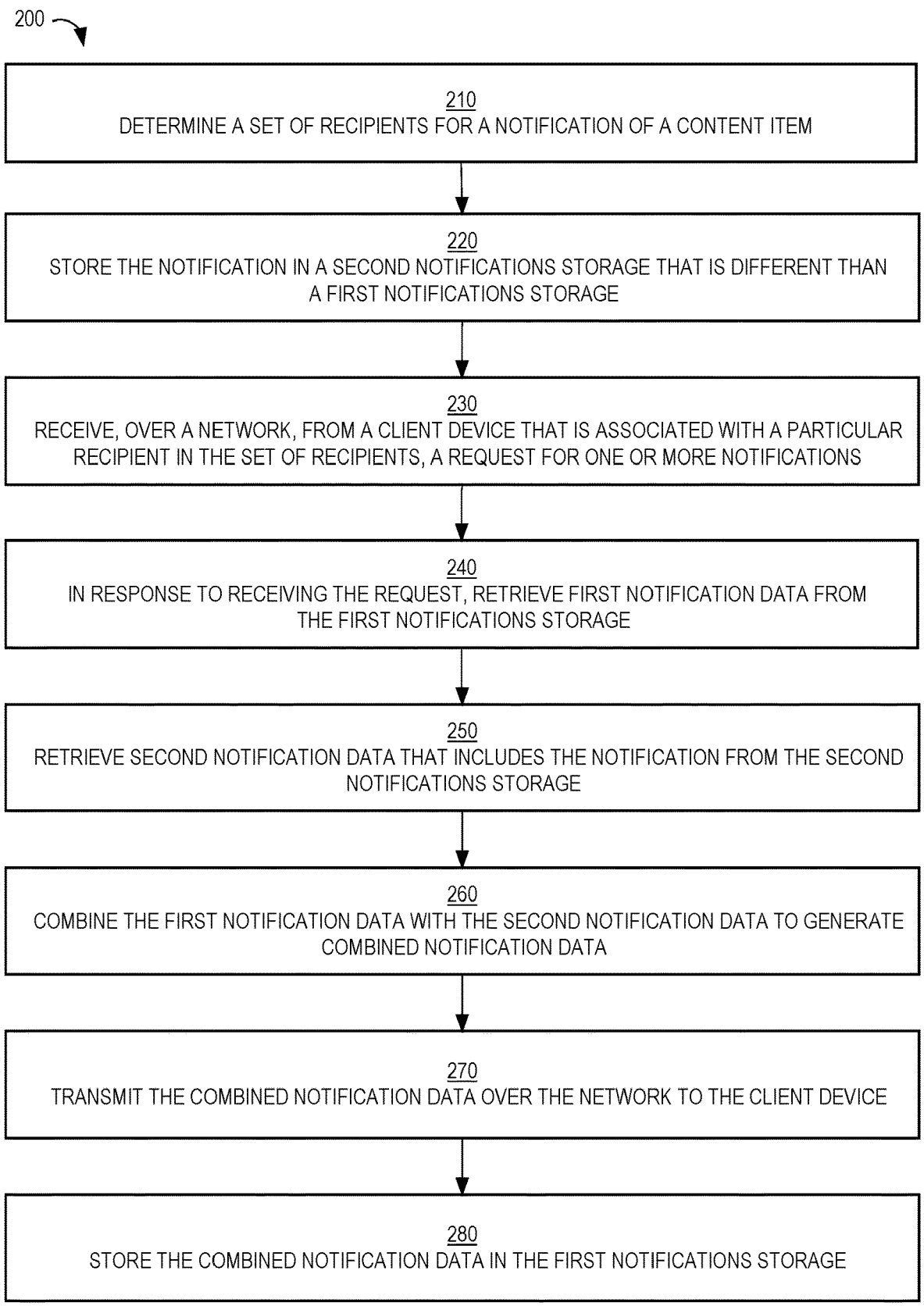
FIG. 2 is a flow diagram that depicts a process for delivering notifications to reduce latency, in an embodiment.

FIG. 2 is a flow diagram that depicts a process 200 for delivering notifications to reduce latency, in an embodiment. Process 200 is performed by different components of server system 130.

At block 210, a set of recipients for a notification of a content item is determined. Block 210 may be performed by amplifier service 136 retrieving a list of recipients from recipient database 138 based on an entity identifier that is associated with (e.g., published) the content item. The set of recipients may have been previously determined by an offline job before server system 130 receives the content item or amplifier service 136 detects the content item. The offline job may involve identifying a current list of followers of a particular entity, such as a registered member of a social network service or a popular organization, and updating recipient database 138 accordingly.

At block 220, the notification is stored in a second notifications storage (e.g., second notifications storage 154) that is separate from a first notifications storage (e.g., first notifications storage 152). The second notifications storage is designed for short-lived and/or fast notifications while the first notifications storage is designed for other types of notifications. Writes to the first notifications storage take longer than writes to the second notifications storage. Block 220 may be performed by amplifier service 136 or by notifications service 140.

The notification is stored in association with each recipient in the set of recipients. Block 220 may involve storing a separate record/entry or updating a separate record/entry for each recipient. For example, if there are one million recipients, then one million records or entries are created or updated to associate the notification with each recipient. Alternatively, block 220 involves storing a single record that stores details of the notification along with a list of recipient identifiers identifying the set of recipients.

At block 230, a request for one or more notifications is received, over a computer network (e.g., network 120), from a client device (e.g., client device 114) that is associated with a particular recipient in the set of recipients. Block 230 may be performed by read processor 156.

At block 240, in response to receiving the request, first notification data is retrieved from the first notifications storage. Block 240 may involve read processor 156 identifying a member/recipient identifier in the request, sending, to first notifications storage 152, the recipient identifier, and receiving, from first notifications storage 152, one or more notifications. The one or more notifications may include notifications that have already been delivered to (or presented to) the recipient in the past.

At block 250, also in response to receiving the request, second notification data that includes the notification is retrieved from the second notifications storage. Block 250 may involve read processor 156 sending, to second notifications storage 154, the recipient identifier, and receiving, from second notifications storage 152, the notification and, optionally, one or more other notifications.

At block 260, the first notification data is combined with the second notification data to generate combined notification data. Block 260 is performed by read processor 156 or a related component.

At block 270, the combined notification data is transmitted over the computer network to the client device.

Optionally, at block 280, the combined notification data (including the notification) is stored in the first notifications storage. The first notifications storage acts as an inbox showing all or many past notifications that have been presented to the recipient and, at different points in time, may contain one or more "slow" or "long-lived" notifications that have not yet been presented to the recipient. Block 280 may also involve deleting the notification from the second notifications storage. Therefore, later, if a request from the same recipient is received, then no notifications for the recipient may be available in the second notifications storage 152. Alternatively, the notification is retained in the second notifications storage. In this alternative, in a subsequent read request initiated by the recipient, the notification would be combined again with one or more notifications from the first notifications storage.

Blocks 230-280 may be performed for each recipient from which a read request is received. For example, if there are one hundred thousand recipients for a notification, then server system 130 receives only ten thousand read requests from those recipients. Many recipients might not wish to view the notification, may have computing devices that are currently turned off, or might have established a setting that turns off notifications if the recipient is not already in the client application. Recipients that have established that setting are filtered out in the offline job.

In some scenarios, there might not be any notifications in first notifications storage 152. Instead, a notification is available in second notifications storage 154. In such cases, no combining is performed. However, optionally, the notification is replicated to first notifications storage 152 and removed from second notifications storage 154.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
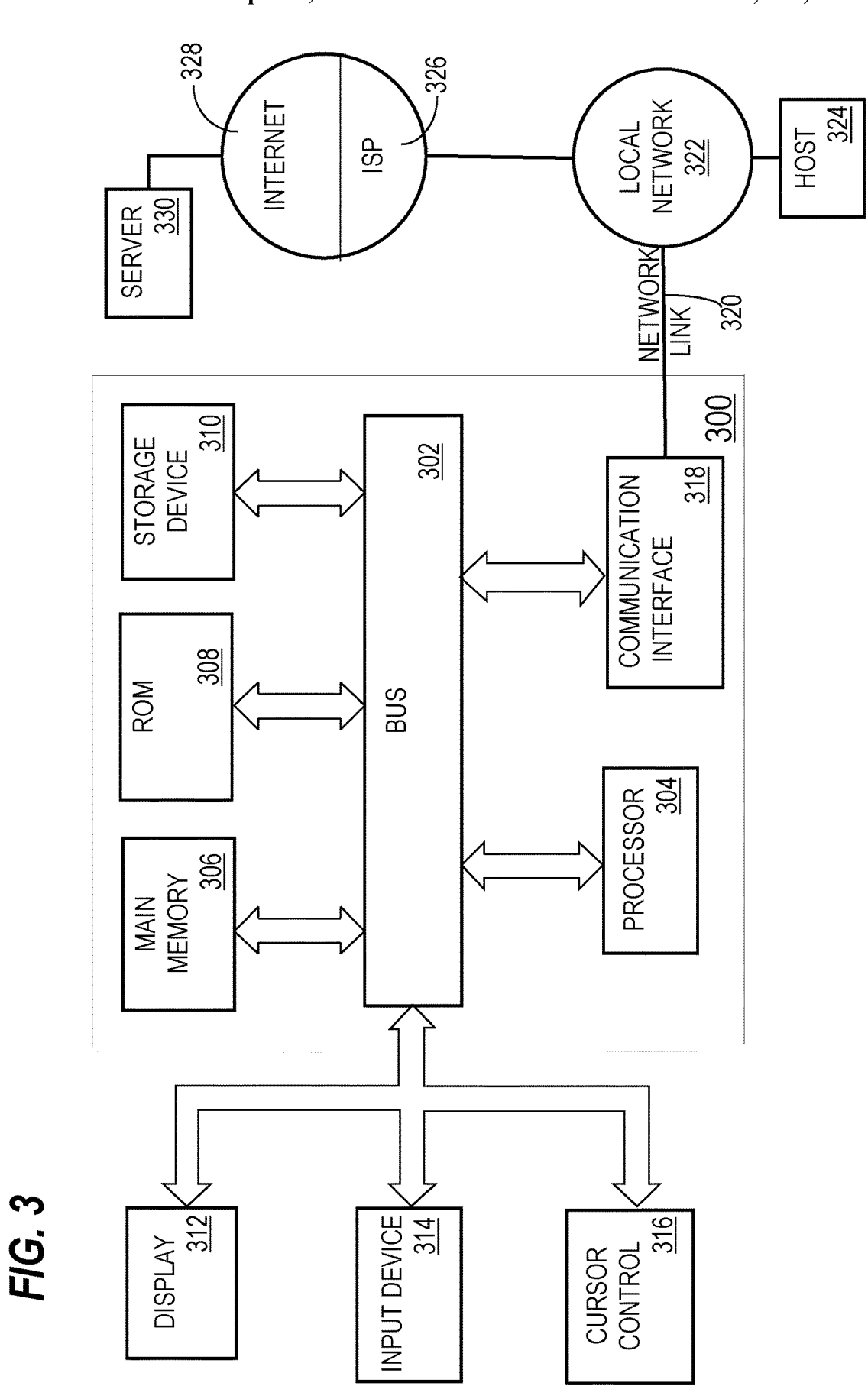
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining a set of recipients for a notification of a content item;
   storing the notification in a second notifications storage that is separate from a first notifications storage;
   receiving, over a computer network, from a client device that is associated with a particular recipient in the set of recipients, a request for one or more notifications;
   in response to receiving the request:

retrieving, from the first notifications storage, first notification data;

retrieving, from the second notifications storage, second notification data that includes the notification;

combining the first notification data with the second notification data to generate combined notification data;

transmitting, over the computer network, to the client device, the combined notification data;

storing the combined notification data in the first notifications storage;

wherein the method is performed by one or more computing devices.

2. The method of claim 1, further comprising removing the second notification data from the second notifications storage.

3. The method of claim 2, further comprising, after removing the second notification data from the second notifications storage:

receiving, from the client device that is associated with the particular recipient, a second request for one or more notifications;

in response to receiving the second request:
retrieving the combined notification data from the first notifications storage;
determining whether any notifications are available for the particular recipient in the second notifications storage;
after determining whether any notifications are available for the particular recipient in the second notifications storage, transmitting, over the computer network, to the client device, the combined notification data.

4. The method of claim 1, wherein the notification is a first notification, further comprising:

prior to storing the first notification in the second notifications storage:
determining that the first notification is of a first type of a plurality of types;
based on determining that the first notification is of the first type, causing the first notification to be stored in the second notifications storage instead of the first notifications storage;
determining a second set of recipients for a second notification of a second content item;
determining that the second notification is of a second type, of the plurality of types, that is different than the first type;
based on determining that the second notification is of the second type, causing the second notification to be stored in the first notifications storage instead of the second notifications storage.

5. The method of claim 1, further comprising, prior to determining the set of recipients for the notification of the content item:

determining the set of recipients associated with a particular entity;
determining that the content item is associated with the particular entity;
wherein determining the set of recipients for the notification of the content item is performed in response to determining that the content item is associated with the particular entity.

6. The method of claim 1, further comprising:

receiving a plurality of heartbeat messages indicating that a plurality of client applications are active;

storing presence data that includes a plurality of entity identifiers that are associated with the plurality of client applications;

updating the presence data to remove an entity identifier if a heartbeat message has not been received from a corresponding client application in a period of time.

7. The method of claim 1, further comprising:

determining that each recipient in a strict subset of the set of recipients is associated with an online status;
wherein the strict subset includes the particular recipient;
for each recipient in the strict subset, causing a second notification about the content item to be presented to said each recipient as an overlay over a view of content provided by a particular application that executes on a client device of said each recipient and is currently active.

8. The method of claim 1, further comprising:

determining that each recipient in a strict subset of the set of recipients is associated with an offline status;
wherein the strict subset includes the particular recipient;
for each recipient in the strict subset, causing a second notification about the content item to be transmitted to a client device, of said each recipient, that executes a particular application that is currently installed and inactive.

9. The method of claim 1, further comprising:

in response to receiving data about the content item, identifying an entity identifier associated with the content item;
transmitting the entity identifier to a particular storage system that stores entity identifiers in association with corresponding recipient lists;
receiving, from the particular storage system, the set of recipients that are associated with the entity identifier.

10. The method of claim 9, further comprising:

executing an offline job that identifies, for the entity identifier, a plurality of possible recipients and generates a score for each possible recipient in the plurality of possible recipients;
wherein determining the set of recipients based on the score for each possible recipient in the plurality of possible recipients;
wherein the set of recipients is fewer in number than the plurality of possible recipients.

11. The method of claim 1, wherein the content item is one of a video stream, a daily digest, or a breaking news item.

12. The method of claim 1, further comprising:

waiting a period of time after receiving data about the content item before causing the notification to be stored in the second notifications storage.

13. The method of claim 1, wherein storing the notification in the second notifications storage further comprises causing data center data that indicates a first data center in which data about the content item was received to be stored in association with the notification, further comprising:

replicating the notification and the data center data to a second data center that is different than the first data center;
receiving, at the second data center, from a second client device, a second request for one or more notifications;
in response to receiving the second request:
retrieving the notification and the data center data;
determining whether the content item is not available in the second data center;

in response to determining that the content item is not available in the second data center, sending, to the first data center, a particular request for the content item.

14. One or more storage media storing instructions which, when executed by one or more processors, cause:
  determining a set of recipients for a notification of a content item;
  storing the notification in a second notifications storage that is separate from a first notifications storage;
  receiving, over a computer network, from a client device that is associated with a particular recipient in the set of recipients, a request for one or more notifications;
  in response to receiving the request:
    retrieving, from the first notifications storage, first notification data;
    retrieving, from the second notifications storage, second notification data that includes the notification;
    combining the first notification data with the second notification data to generate combined notification data;
    transmitting, over the computer network, to the client device, the combined notification data;
    storing the combined notification data in the first notifications storage.

15. The one or more storage media of claim 14, wherein the instructions, when executed by the one or more processors, further cause:
  removing the second notification data from the second notifications storage.
  after removing the second notification data from the second notifications storage:
    receiving, from the client device that is associated with the particular recipient, a second request for one or more notifications;
    in response to receiving the second request:
      retrieving the combined notification data from the first notifications storage;
      determining whether any notifications are available for the particular recipient in the second notifications storage;
      after determining whether any notifications are available for the particular recipient in the second notifications storage, transmitting, over the computer network, to the client device, the combined notification data.

16. The one or more storage media of claim 14, wherein the notification is a first notification, wherein the instructions, when executed by the one or more processors, further cause:
  prior to storing the first notification in the second notifications storage:
    determining that the first notification is of a first type of a plurality of types;
    based on determining that the first notification is of the first type, causing the first notification to be stored in the second notifications storage instead of the first notifications storage;
  determining a second set of recipients for a second notification of a second content item;
  determining that the second notification is of a second type, of the plurality of types, that is different than the first type;
  based on determining that the second notification is of the second type, causing the second notification to be stored in the first notifications storage instead of the second notifications storage.

17. The one or more storage media of claim 14, further comprising, prior to determining the set of recipients for the notification of the content item:
  determining the set of recipients associated with a particular entity;
  determining that the content item is associated with the particular entity;
  wherein determining the set of recipients for the notification of the content item is performed in response to determining that the content item is associated with the particular entity.

18. The one or more storage media of claim 14, wherein the instructions, when executed by the one or more processors, further cause:
  receiving a plurality of heartbeat messages indicating that a plurality of client applications are active;
  storing presence data that includes a plurality of entity identifiers that are associated with the plurality of client applications;
  updating the presence data to remove an entity identifier if a heartbeat message has not been received from a corresponding client application in a period of time.

19. The one or more storage media of claim 14, wherein the instructions, when executed by the one or more processors, further cause:
  in response to receiving data about the content item, identifying an entity identifier associated with the content item;
  transmitting the entity identifier to a particular storage system that stores entity identifiers in association with corresponding recipient lists;
  receiving, from the particular storage system, the set of recipients that are associated with the entity identifier.

20. The one or more storage media of claim 14, wherein storing the notification in the second notifications storage further comprises causing data center data that indicates a first data center in which data about the content item was received to be stored in association with the notification, wherein the instructions, when executed by the one or more processors, further cause:
  replicating the notification and the data center data to a second data center that is different than the first data center;
  receiving, at the second data center, from a second client device, a second request for one or more notifications;
  in response to receiving the second request:
    retrieving the notification and the data center data;
    determining whether the content item is not available in the second data center;
    in response to determining that the content item is not available in the second data center, sending, to the first data center, a particular request for the content item.

* * * * *